US008271322B2

(12) United States Patent
Ariyibi

(10) Patent No.: US 8,271,322 B2
(45) Date of Patent: Sep. 18, 2012

(54) CUSTOMER EXPERIENCE MANAGEMENT SYSTEM

(75) Inventor: Charles A. Ariyibi, Old Greenwich, CT (US)

(73) Assignee: Distinctive Technologies LLC, Old Greenwich, CT (US)

( * ) Notice: Subject to any disclaimer, the term of this patent is extended or adjusted under 35 U.S.C. 154(b) by 586 days.

(21) Appl. No.: 12/177,461

(22) Filed: Jul. 22, 2008

(65) Prior Publication Data

US 2010/0023401 A1    Jan. 28, 2010

(51) Int. Cl.
G06Q 40/00    (2012.01)

(52) U.S. Cl. ............ 705/14.1; 14/25; 14/3; 14/36; 14/4; 14/65

(58) Field of Classification Search ...................... 705/14
See application file for complete search history.

(56) References Cited

U.S. PATENT DOCUMENTS

| 6,179,206 | B1 | 1/2001 | Matsumori |
| 7,156,303 | B1 | 1/2007 | Holzman |
| 7,178,722 | B2 | 2/2007 | Do |
| 7,270,266 | B2 | 9/2007 | Silverbrook |
| 7,318,041 | B2 | 1/2008 | Walker |
| 7,357,323 | B2 | 4/2008 | Silverbrook et al. |
| 2002/0016740 | A1 | 2/2002 | Ogasawara |
| 2004/0093265 | A1 | 5/2004 | Ramchandani |
| 2004/0093268 | A1 | 5/2004 | Ramchandani |
| 2005/0177423 | A1* | 8/2005 | Swanson .................. 705/14 |
| 2007/0138268 | A1* | 6/2007 | Tuchman .................. 235/383 |
| 2007/0174115 | A1 | 7/2007 | Chieu |
| 2007/0185776 | A1 | 8/2007 | Nguyen |
| 2007/0192182 | A1 | 8/2007 | Monaco |
| 2007/0192183 | A1 | 8/2007 | Monaco |
| 2008/0021772 | A1 | 1/2008 | Aloni et al. |

FOREIGN PATENT DOCUMENTS

| KR | 10-2005-0075327 A | 7/2005 |
| KR | 10-2006-0132190 A | 12/2006 |

* cited by examiner

*Primary Examiner* — Thomas M Hammond, III
(74) *Attorney, Agent, or Firm* — Wiggin and Dana LLP

(57) ABSTRACT

A system and method for engaging a customer in an enhanced shopping experience. The customer provides customer information which is stored on a database. An identifying token (e.g. a card) is issued to the customer. This identifying token is detected (e.g. by an RFID sensor) when carried by the customer into a retailer's space. This causes at least a portion of the customer information to be accessible from the database to retail personnel while the customer is physically present in the retailer's space, thereby facilitating personal engagement by the retail personnel with the customer.

22 Claims, 6 Drawing Sheets

CUSTOMER EXPERIENCE MANAGEMENT SYSTEM

FIELD OF THE DISCLOSURE

This disclosure relates to a system for facilitating a customer loyalty program, and more particularly to a system for offering an enhanced shopping experience in a retail store based on a customer's loyalty and preferences.

BACKGROUND OF THE DISCLOSURE

Customer Relationship Management (CRM) systems use various information technologies to learn a customer's preferences, offer merchandise to the customer according to those preferences, and to foster or reward customer loyalty. In order to maintain a high level of customer loyalty, it is desirable for a retailer to enhance a customer's in-store experience by anticipating her preferences and offering customized services.

SUMMARY OF THE DISCLOSURE

The present disclosure provides a method for engaging a customer in an enhanced shopping experience. The customer provides customer information which is stored on a database. An identifying token (e.g. a card) is issued to the customer. This identifying token is detected (e.g. by an RFID sensor) when carried by the customer into a retailer's space. This causes at least a portion of the customer information to be accessible from the database to retail personnel while the customer is physically present in the retailer's space, thereby facilitating personal engagement by the retail personnel with the customer.

The identifying token may include a first RFID transmitter used in detecting presence of the customer and in tracking the customer's movements, and a second RFID transmitter used in facilitating a purchase.

The method may also include determining whether the customer has elected to share customer information with the retailer. If the customer has not elected to share customer information with the retailer, a message is transmitted to the customer upon the customer's entry into the store, offering the enhanced shopping experience. Customer information from the database is then made accessible to retail personnel in accordance with an authorization message from the customer, and the customer information is accessible to the retail personnel only while the customer is physically present in the store.

According to another aspect of the invention, a system comprises a server configured to include a customer portal, a store portal, a database, an identifying token (including, e.g. an RFID transmitter) carried by the customer, and a sensor installed in the store. The customer portal, accessible by a customer over a network, permits entry of customer information. The store portal, accessible by retail personnel over the network, is used to transmit a message to the retail personnel regarding physical presence of the customer in the store, and permits retrieval of at least a portion of the customer information by the retail personnel. The database is in communication with the server and stores the customer information. The sensor receives a signal from the identifying token, indicating that a customer carrying the identifying token has entered the retailer's space.

The foregoing has outlined, rather broadly, the preferred features of the present disclosure so that those skilled in the art may better understand the detailed description of the disclosure that follows. Additional features of the disclosure will be described hereinafter that form the subject of the claims of the disclosure. Those skilled in the art should appreciate that they can readily use the disclosed conception and specific embodiment as a basis for designing or modifying other structures for carrying out the same purposes of the present disclosure and that such other structures do not depart from the spirit and scope of the disclosure in its broadest form.

DETAILED DESCRIPTION

In a Customer Experience Management (CEM) system embodying the disclosure, a customer is issued a loyalty card or similar token having an RFID transmitter embedded therein. When the customer, carrying the card, enters a store, her presence is automatically signaled to store personnel. Store personnel are then able to retrieve individual customer information such as the customer's name, size, favorite colors, personal style preferences, etc. This permits the store to anticipate the customer's needs and offer personalized service, thereby enhancing the customer's in-store experience.

CEM Process: Customer Registration and Identification

Figure 1A:
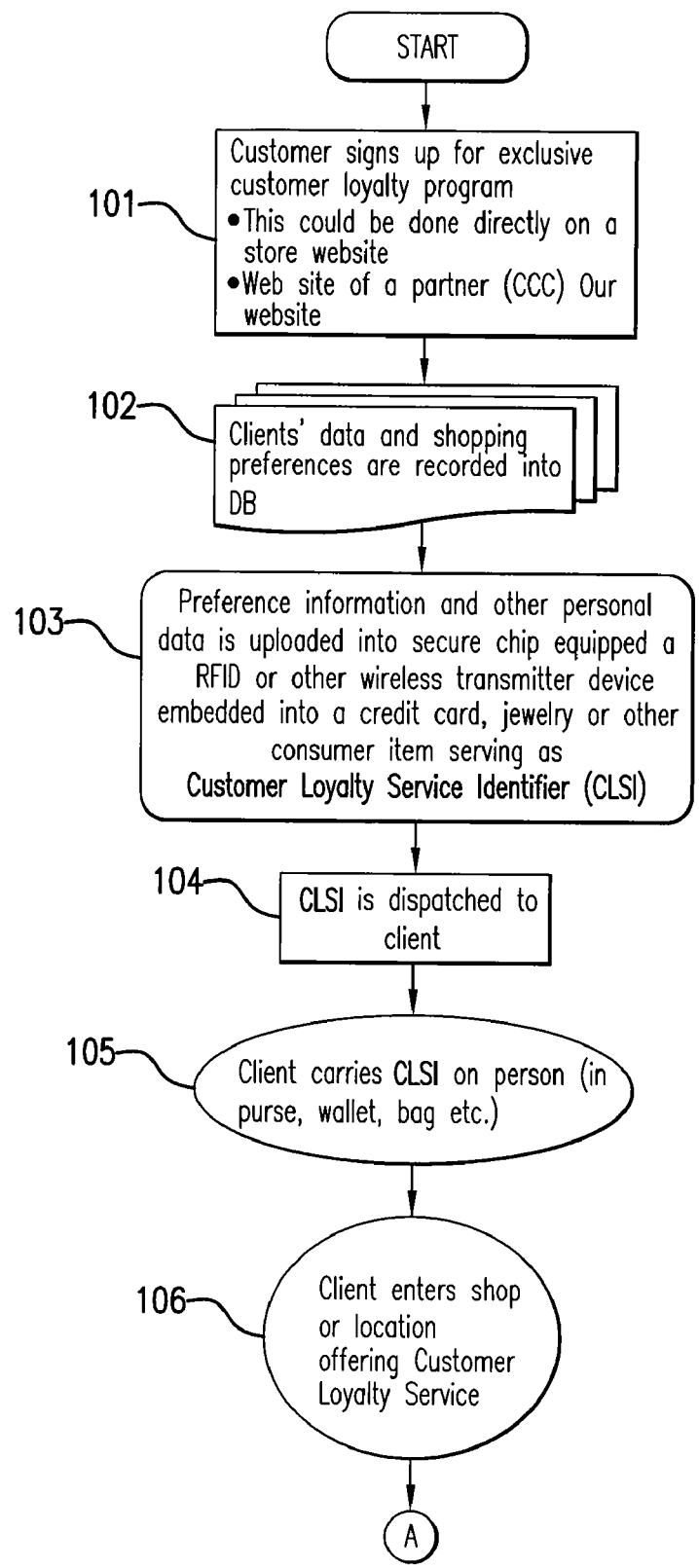
FIGS. 1A and 1B are connected flowcharts illustrating steps in a CEM process, according to an embodiment of the disclosure.
Figure 1B:
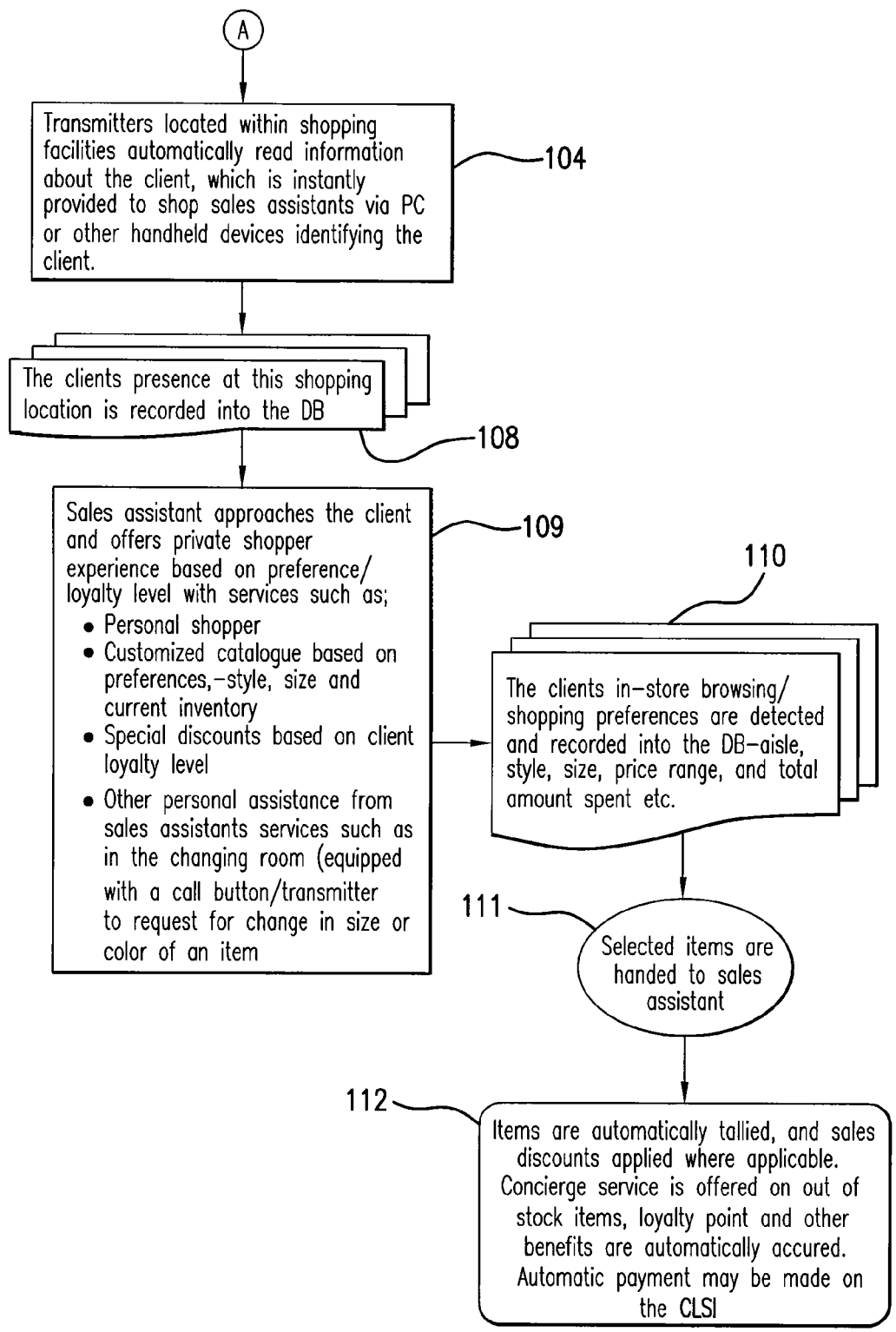

A flowchart of the CEM process, according to an embodiment, is shown in FIGS. 1A and 1B. The customer initiates the process by registering in a retailer's customer loyalty program (step 101). This is advantageously done using an on-line connection to a customer portal, described in further detail below. The customer may register directly with the retailer through the retailer's own website, or by visiting a partnering website (e.g. a website operated by a CEM vendor on behalf of the retailer). As part of the registration process, the customer enters certain personal data and shopping preferences (step 102) which are stored on the CEM database.

In step 103, the information provided by the customer is encoded onto a secure, machine-readable medium (e.g. a memory chip) embedded into a card (e.g. a credit card) or other token (e.g. an item of jewelry) to be carried by the customer. A vicinity/proximity RFID transmitter, or other wireless transmitter device, is likewise embedded in the card or token. This item will be referred to herein as a Customer Loyalty Service Identifier (CLSI). The CLSI is prepared and sent to the customer (step 104).

In an embodiment, the transmitter is capable of signaling the presence of the customer carrying the CLSI at a range of about 1.5 m. The customer carries the CLSI on her person (step 105), so that when she enters a store participating in the CEM (step 106), her presence is automatically detected by sensors installed in the store.

CEM Process: In-Store Experience

The in-store sensors, in-store PC terminals, and/or clerks' handheld devices are advantageously linked over a network to a store portal, described in further detail below. Once the customer's presence is detected, information about the customer is transmitted from the CLSI and/or retrieved from the CEM database, sent to the store portal (step 107), and then to store personnel. A store clerk thus may be alerted to a customer's entering the store by receiving a message on a handheld device; the clerk may then go to the customer and greet her by name. The customer's visit is tracked and recorded in the CEM database (step 108).

The store clerk proceeds to offer the customer a personalized shopping experience, in accordance with the customer's preferences (step 109). The store clerk is able to respond to the customers' individual needs based on the individual customer profile retrieved from the database; this provides the clerk with opportunities for up-selling and targeted sales. As the customer moves through the store, other in-store sensors keep a record of which displays or items held her interest; this information is used to update the customer's profile on the CEM database (step 110). If the customer has a CLSI but has not previously elected to share information with the retailer, store personnel (through the CEM system) may request authorization from the customer to access her online profile; this situation is discussed further below.

When the customer is ready to complete her purchases and leave the store (step 111), other services (e.g. loyalty discounts) may be offered in accordance with the information on the CLSI or the customer profile in the database. If the CLSI is included in a credit card, payment may be made automatically using the CLSI to charge the credit account (step 112). In another embodiment, information encoded on the CLSI may be used to link to the customer's bank account, so that payment for the purchases is automatically deducted from the bank account. In another embodiment, where several participating stores are grouped together (e.g. in a shopping mall), the customer could accumulate purchases in several stores perhaps in a shopping cart, and automatically pay for all purchases at once upon exiting the store or mall location.

Customer Portal

Figure 2:
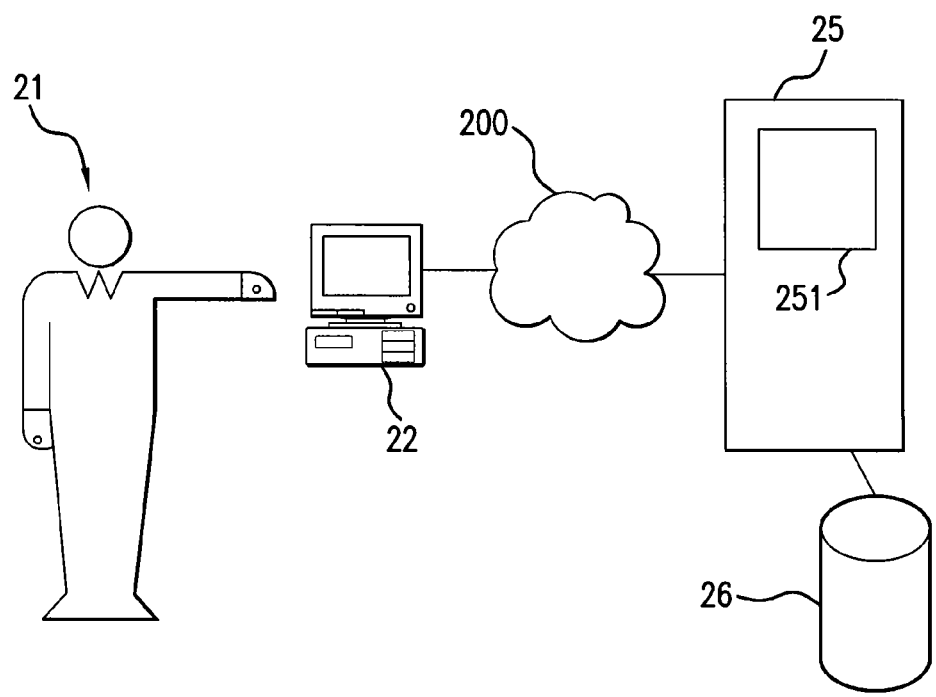
FIG. 2 schematically illustrates a system for registering a customer with a CEM service using a customer portal, according to an embodiment of the disclosure.

The customer portal provides a convenient means by which a customer may register for loyalty services. A CEM system including a customer portal is shown schematically in FIG. 2. In this embodiment, customer 21, using a PC 22, connects to a web server 25 over network 200 (e.g. the Internet). Customer portal 251 (software running on server 25) provides an access point for customer 21 to input personal information. The customer may also use any of a variety of devices to communicate with the portal over the network. The customer is invited to log in and respond to a series of questionnaires indicating personal information, shopping preferences and style information. In an embodiment, the customer also indicates customer loyalty programs to which she already belongs, selects from a list of participating retail stores and brands where the customer wishes to shop, and indicates online retailers where the customer maintains a personal profile. This information is then retained in a secure online database 26. A unique personal ID is assigned to the customer, and is embedded into the RFID based personal identifier or CLSI.

Customer 21 may be a member of more than one loyalty program. In an embodiment, customer portal 251 is configured to leverage, integrate and authenticate across other existing loyalty programs to which the customers may belong, and provide customer recognition and rewards based on individual status.

Customer 21 preferably accesses web server 25 using a secure technology such as SSL. The CLSI (RFID based personal identifier card, device or other form factor) is equivalent to a web browser cookie and single sign-on customer profile; the CLSI stores individual shopping preferences, facilitating instant customer recognition and multiplatform loyalty rewards and personalized shopping experience and benefits.

After registering, the customer may receive customized alerts and links pointing to sales and events relevant to her shopping preferences. In an embodiment, the customer may also input shopping lists which will be transmitted to participating stores that may be able to fulfill the requests.

Customer Loyalty Card

In an embodiment, the CLSI (CEM personal identification) is based on a dual protocol (ISO 15693/ISO 14443) RFID transmitter embedded in a card or device of other form factor. The ISO 15693 and ISO 14443 protocols relate to "vicinity" and "proximity" devices respectively. The RFID transmitter thus functions both as a vicinity device permitting secure detection and authentication at distances of about 1.5 m (5 feet), and a proximity device serving as a highly secure low range transmitter. The proximity device is based on the same banking industry standards used with contactless payment cards offered by major credit card companies. In this embodiment, the CLSI may be used as a contactless credit or debit card. A customer has the option of automatically charging merchandise purchased via the CLSI to a designated credit card or bank account in the user profile.

Store Portal

Figure 3:
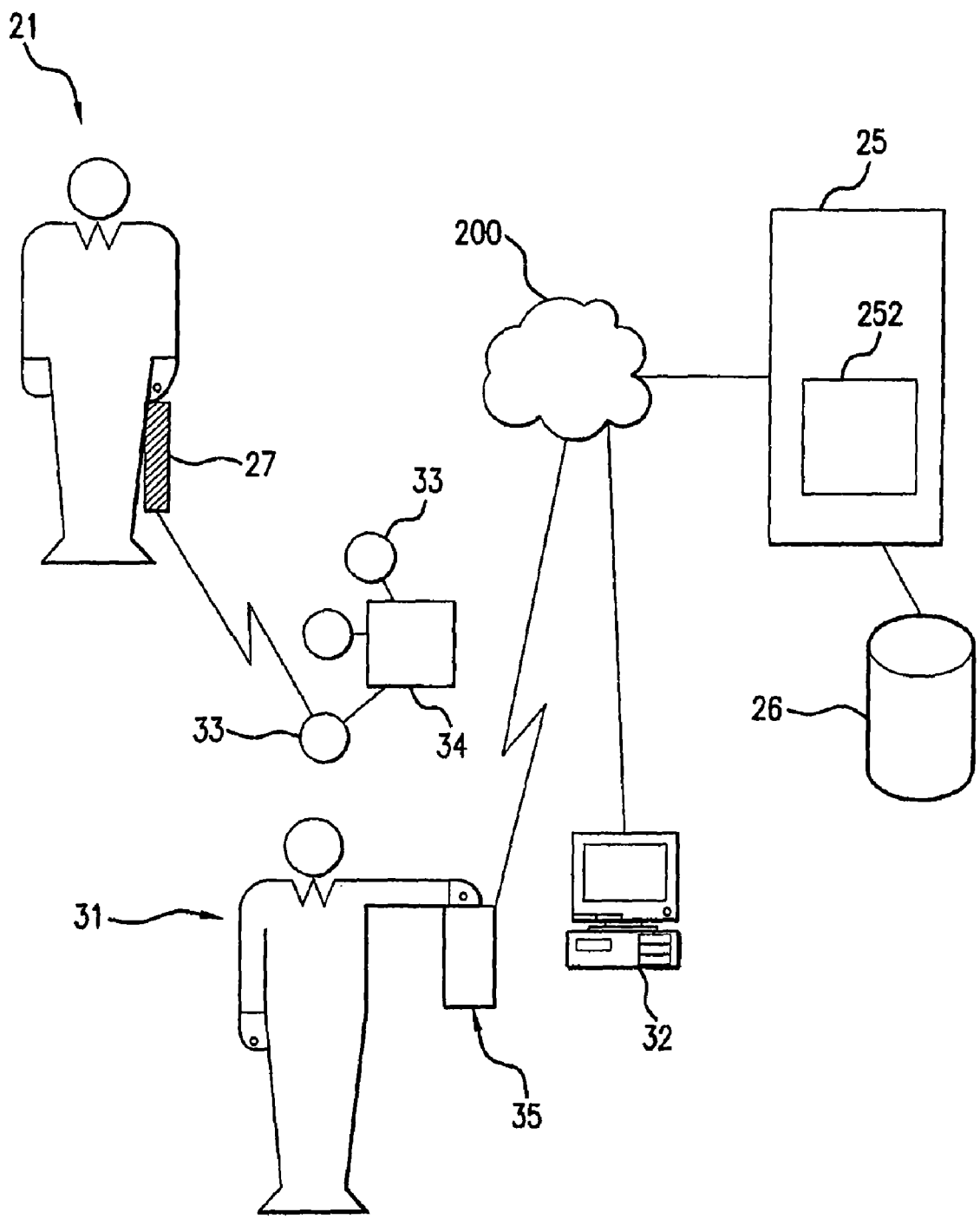
FIG. 3 schematically illustrates a system for offering an enhanced shopping experience to a registered customer using an RFID personal identifier and a store portal, according to an embodiment of the disclosure.

A CEM system including a store portal, schematically illustrating interaction between a customer 21 carrying a CLSI 27, the store portal 252, and store personnel 31, is shown in FIG. 3. Store portal 252 is shown running on server 25, and is linked to in-store devices (e.g. a store clerk's PC 32, a store clerk's handheld device 35, and RFID sensor controller 34 linked to sensors 33) via network 200. An RFID sensor 33 detects the customer's presence upon entering the store; a detection signal is automatically sent to the portal 252. The portal automatically generates an e-mail, SMS or MMS message for delivery to store clerk 31 via PC 32 and/or a "smart phone," PDA or other handheld PC device 35. Store personnel may then authenticate to secure online database 26 and retrieve customer information therefrom. This information may include relevant portions of the customer's profile (e.g. shopping preferences related to the particular store, any shopping lists outstanding that the store can fulfill, etc), along with customer loyalty reward status. Based on this information the customer 21 is then provided with a personalized shopping experience, including personal shopper, stylist and other recognition, along with discounts and services for which the customer may be eligible. In an embodiment, each store clerk is provided with a handheld device that is able to retrieve current store inventory matched against the individual customer preference, style suggestions, upcoming merchandise matching the consumer's preferences, etc.

Figure 4:
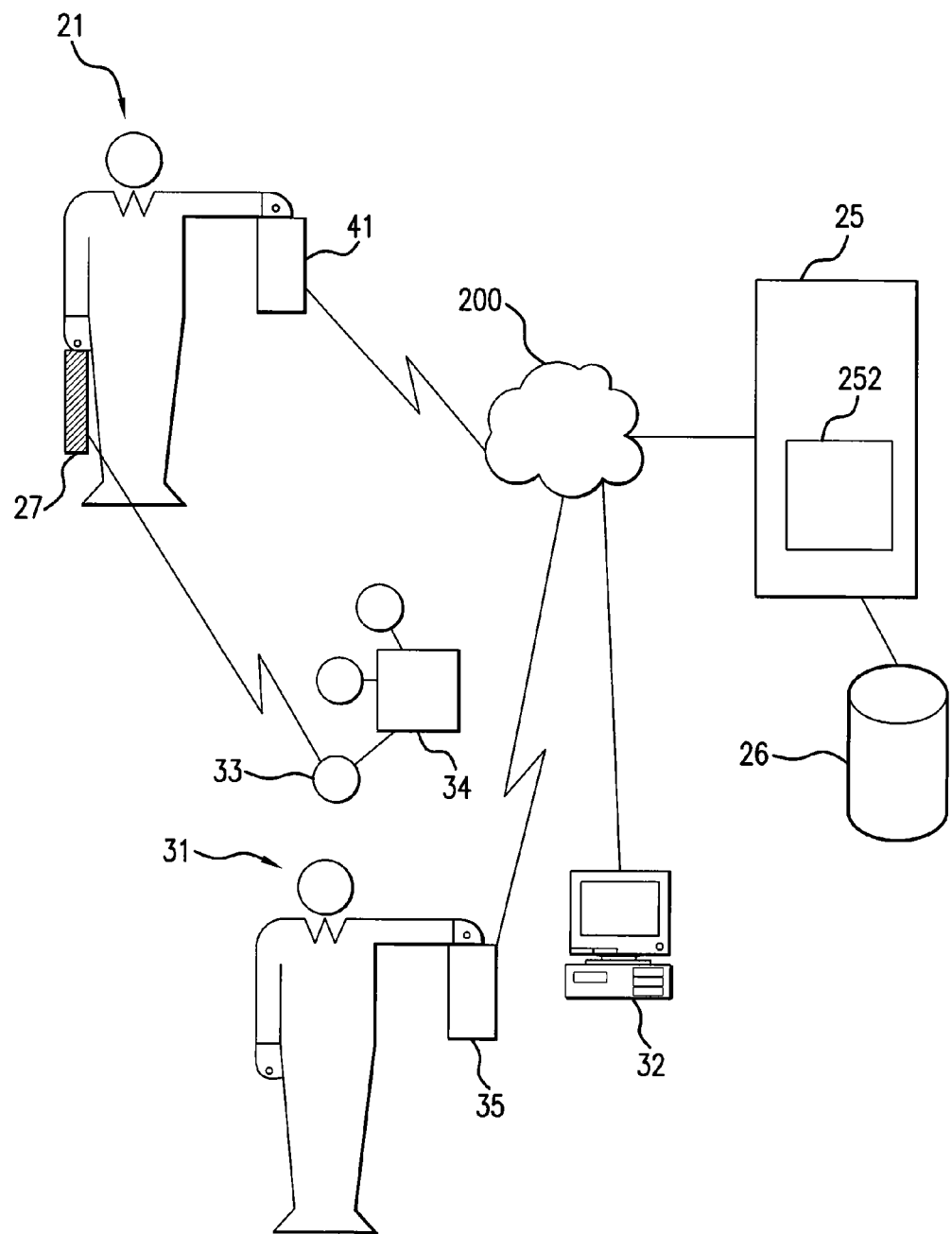
FIG. 4 schematically illustrates a system for offering an enhanced shopping experience to an unregistered customer, according to another embodiment of the disclosure.

The above discussion relates to a situation where customer 21 previously indicated a preference for the store in her online profile. In a further embodiment, a system for offering an enhanced in-store experience to other customers (who have not indicated a preference for the store) is shown in FIG. 4. If customer 21 has a profile stored on database 26 but has not elected to share information with the store, portal 252 receives a detection signal as in the previous embodiment, and then automatically generates an e-mail, SMS or MMS message to the customer's mobile device 41, offering personalized service based on the applicable loyalty program. Alternatively, portal 252 may direct an alert signal to store personnel 31, giving the customer's contact information and prompting store personnel to send a personalized message to the customer.

Customer 21 may then respond to the message, either approving or declining the offer of customized shopping. The customer grants approval by sending a reply message to the store portal, authorizing sharing of her customer profile information with that store. In this situation, store personnel would only be permitted to access the customer's individual profile while the customer is inside the store.

The customer may make a shopping list in advance and transmit the list to the customer portal, thereby adding the shopping list to her profile. As part of the enhanced shopping experience, store personnel may retrieve the shopping list in addition to becoming familiar with the customer's preferences.

In an embodiment, the store portal may also receive billing data in order to update the customer's profile and the store loyalty system with relevant information.

Customer Tracking; External Systems

Figure 5:
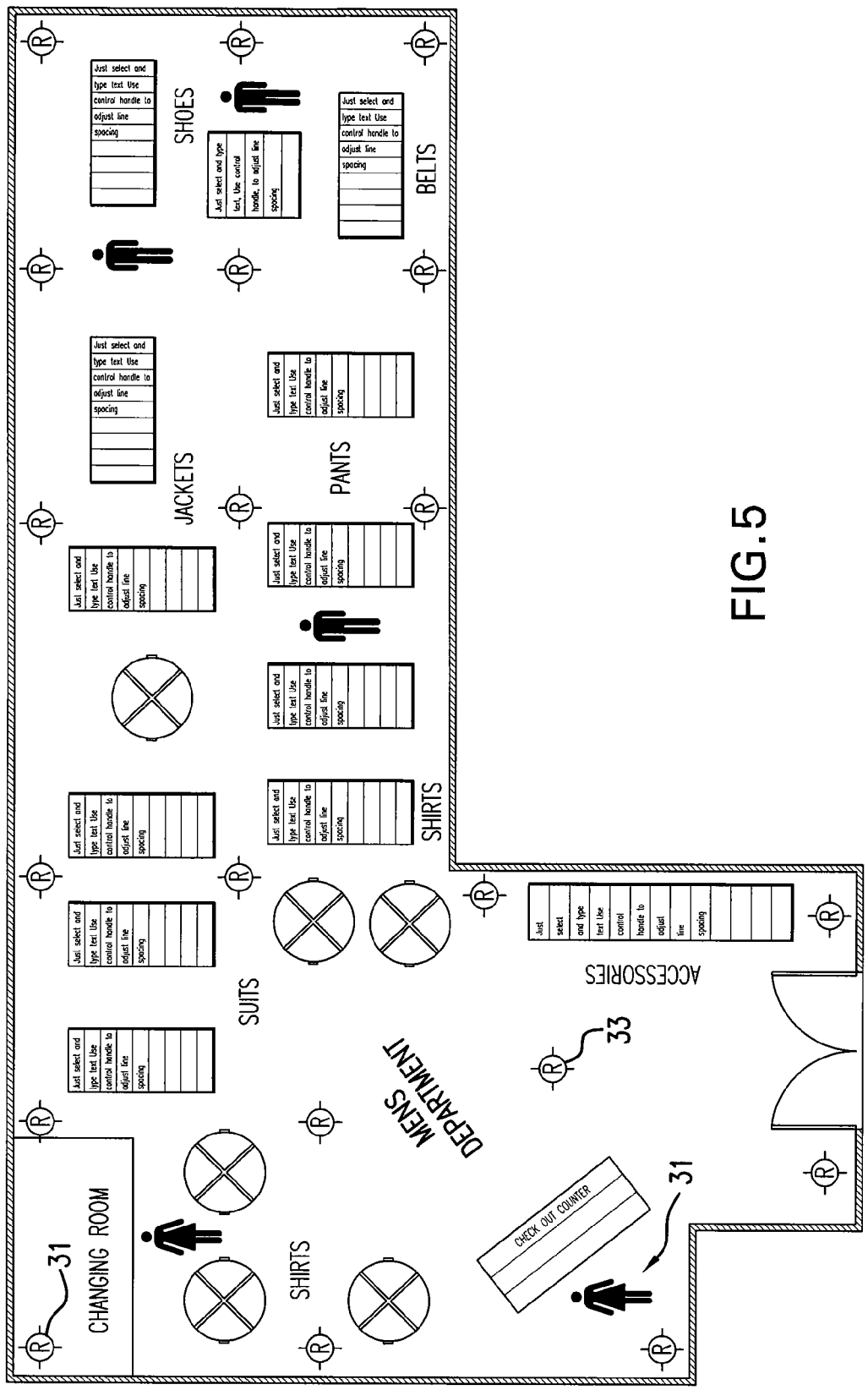
FIG. 5 schematically illustrates a store configuration for tracking a customer's movements inside a store, according to another embodiment of the disclosure.

According to a further embodiment, an array of longer range RFID sensors 33 (having a range of about 3-5 m) is installed in the store to track the customer's movements through the store (see FIG. 5). As the customer visits different places in the store, thereby showing interest in specific items, store browsing data (that is, locations where the customer spent more than a few minutes) is collected and sent to the store portal 252, which then updates the customer's profile on database 26. The store browsing data is also compiled and added to intelligence data for the store.

More generally, all data relating to the customer's in-store experience (including but not limited to browsing and sales transactions) may be collected and stored in database 26. This data (also generally termed shopper intelligence data) permits retailers to better plan and respond to customer needs and preferences.

Retailers may integrate the CEM system described herein into their existing RFID based inventory control and supply chain systems in order to leverage the shopper intelligence information provided.

The CEM system may also include a custom module allowing integration with multiple loyalty programs that may be selected by the customer. In an embodiment, the module implements a table mapping the portal user ID to the various loyalty system identifications provided within the customer profile. Accordingly, all customer sales and transactional data collected may be transmitted to the relevant loyalty system via a custom designed procedure, allowing shoppers to receive the acquired customer loyalty points and benefits across programs without the need to carry additional loyalty reward membership cards.

While the disclosure has been described in terms of specific embodiments, it is evident in view of the foregoing description that numerous alternatives, modifications and variations will be apparent to those skilled in the art. Accordingly, the disclosure is intended to encompass all such alternatives, modifications and variations which fall within the scope and spirit of the disclosure and the following claims.

I claim:

1. A method for engaging a customer in an enhanced shopping experience, comprising:
    storing customer information received from the customer on a database, the customer information including shopping preferences of the customer with regard to at least one of a retailer, a retail location, and a brand; and
    information regarding a plurality of loyalty programs to which the customer belongs;
    issuing an identifying token to the customer, where the token includes a machine-readable medium having the customer information encoded thereon;
    electronically detecting a location of a signal transmitted from the identifying token when carried by the customer entering into a retailer's space;
    causing at least a portion of the customer information to be accessible from the database to retail personnel physically present in the retailer's space while the customer is physically present in the retailer's space;
    determining, from the customer information and in accordance with said detecting, a loyalty reward status of the customer;
    notifying the retail personnel regarding presence of the customer in the retailer's space and the loyalty reward status of the customer;
    offering, through personal contact by the retail personnel at the detected location of the customer, the enhanced shopping experience, wherein the enhanced shopping experience comprises offering a reward to the customer based on the determined loyalty reward status of the customer; and
    updating the stored customer information in accordance with the enhanced shopping experience,
    wherein the identifying token is retained by the customer both prior to and subsequent to the customer being physically present in the retailer's space.

2. A method for engaging a customer in an enhanced shopping experience, comprising:
    electronically detecting a location of a signal transmitted from an identifying token carried by the customer entering into a retailer's space, the token including a machine-readable medium having customer information encoded thereon;
    determining, from the customer information and in accordance with said detecting, a loyalty reward status of the customer with respect to the retailer; and
    offering, through personal contact by the retail personnel at the detected location of the customer, the enhanced shopping experience, wherein the enhanced shopping experience comprises offering a reward to the customer based on the determined loyalty reward status of the customer,
    wherein the identifying token is retained by the customer both prior to and subsequent to the customer being physically present in the retailer's space.

3. A method according to claim 2, further comprising the step of electronically recording the customer's entry into the retail space.

4. A method according to claim 3, further comprising electronically recording a change in the customer loyalty reward status in accordance with the customer's entry into the retail space.

5. A method according to claim 2, wherein said detecting step further comprises tracking the customer's movements within the retail space.

6. A method according to claim 5, further comprising
    compiling customer browsing data based on said tracking, and
    electronically recording the customer browsing data.

7. A method according to claim 5, wherein the identifying token includes a first RFID transmitter used in said detecting and in said tracking, and a second RFID transmitter used in facilitating a purchase.

8. A method according to claim 2, further comprising:
  determining, after said detecting step, whether the customer has elected to share customer information with the retailer; and
  if the customer has not elected to share customer information with the retailer, transmitting a message to the customer offering the enhanced shopping experience.

9. A method according to claim 8, wherein the customer information is caused to be accessible to the retail personnel in accordance with an authorization message from the customer, and the customer information is accessible to the retail personnel only while the customer is physically present in the retailer's space.

10. A system for engaging a customer in an enhanced shopping experience, comprising:
  an identifying token, carried by the customer, wherein the token includes a machine-readable medium having customer information encoded thereon;
  a sensor programmed to detect a location of a signal from the identifying token indicating that a customer carrying in the identifying in token has entered a retailer's space;
  a server, coupled to said sensor and identifying token, programmed to:
    receive customer information, input by the customer through a customer portal accessible over a network, the customer information including:
      shopping preferences of the customer with regard to at least one of a retailer, a retail location, and a brand; and
      information regarding a plurality of loyalty programs to which the customer belongs; and
    transmit a message to retail personnel physically present in a retailer's space regarding the physical presence of the customer in the retailer's space and a loyalty reward status of the customer;
    retrieve at least a portion of the customer information for access by the retail personnel through a store portal; and
    transmit a message via the store portal prompting the retail personnel to offer, through personal contact by the retail personnel at the detected location of the customer,
  the enhanced shopping experience, wherein the enhanced shopping experience comprises offering a reward to the customer based on the determined loyalty reward status of the customer; and
  a database, in communication with the server, programmed to store the customer information, wherein the server is further programmed to update the stored customer information in accordance with the enhanced shopping experience, and wherein the identifying token is retained by the customer both prior to and subsequent to the customer being physically present in the retailer's space.

11. A system according to claim 10, wherein the identifying token includes a first RFID transmitter for generating the signal, and a second RFID transmitter for facilitating a purchase.

12. A system according to claim 10, further comprising a plurality of RFID sensors for tracking movement of the customer within the retailer's space.

13. A system according to claim 10, wherein the server is configured to modify the customer loyalty reward status in accordance with the customer's entry into the retail space.

14. A system according to claim 10, wherein the server is configured to
  determine whether the customer has elected to share customer information with the retailer; and
  if the customer has not elected to share customer information with the retailer, transmit a message to the customer offering an enhanced shopping experience.

15. A system according to claim 14, wherein the customer information is accessible via the store portal to the retailer's personnel in accordance with an authorization message from the customer, and the customer information is accessible to the retail personnel only while the customer is physically present in the retailer's space.

16. A system according to claim 10, wherein the database stores data relating to the customer's experience in the retailer's space.

17. A system according to claim 16, wherein said data includes store browsing data compiled from tracking movement of the customer within the retailer's space.

18. A system according to claim 10, wherein
  the server includes a plurality of store portals, each associated with one of a plurality of retailers each having a customer loyalty program,
  the customer information includes a customer profile with identifiers for a plurality of customer loyalty programs, and
  the server includes a table mapping identifiers of store portals to the loyalty program identifiers in the customer profile,
  thereby facilitating use by the customer of a single identifying token with said plurality of retailers.

19. A method according to claim 2, wherein the identifying token includes a wireless transmitter device other than an RFID transmitter, and said detecting step is performed using a technology in accordance with said wireless transmitter device.

20. A system according to claim 10, wherein the identifying token includes a wireless transmitter device other than an RFID transmitter, and said sensor is configured to receive the signal from the identifying token using a technology in accordance with said wireless transmitter device.

21. A method for engaging a customer in an enhanced shopping experience, comprising:
  electronically detecting a location of a signal transmitted from an identifying token carried by the customer entering into a retailer's space, retail personnel thereby being alerted to presence of the customer in the retailer's space,
  where the token includes a machine-readable medium having customer information encoded thereon, the customer information including
  shopping preferences of the customer with regard to at least one of a retailer, a retail location, and a brand; and
  information regarding a plurality of loyalty programs to which the customer belongs;
  accessing at least a portion of the customer information, said accessing performed by retail personnel physically present in the retailer's space while the customer is physically present in the retailer's space;

determining, from the customer information and in accordance with said detecting, a loyalty reward status of the customer;

offering, through personal contact by the retail personnel at the detected location of the customer, the enhanced shopping experience, wherein the enhanced shopping experience comprises offering a reward to the customer based on the determined loyalty reward status of the customer; and updating the customer information in accordance with the enhanced shopping experience, wherein the identifying token is retained by the customer both prior to and subsequent to the customer being physically present in the retailer's space.

22. A method according to claim 2, wherein the identifying token includes an RFID transmitter.

* * * * *